United States Patent [19]

Gaul et al.

[11] 4,374,182

[45] Feb. 15, 1983

[54] PREPARATION OF SILICON METAL THROUGH POLYMER DEGRADATION

[75] Inventors: John H. Gaul; Donald R. Weyenberg, both of Midland, Mich.

[73] Assignee: Dow Corning Corporation, Midland, Mich.

[21] Appl. No.: 166,201

[22] Filed: Jul. 7, 1980

[51] Int. Cl.³ .................... B32B 9/00; B05D 3/02
[52] U.S. Cl. ........................ 428/446; 423/341; 423/349; 427/226; 427/374.1; 427/377; 427/397.7
[58] Field of Search ............ 427/226, 397.7, 376.4, 427/377, 374.1; 423/341, 349; 428/446

[56] References Cited

U.S. PATENT DOCUMENTS

| | | | |
|---|---|---|---|
| 2,820,698 | 1/1958 | Kehmg | 423/341 |
| 2,844,441 | 7/1958 | Pellin | 423/341 |
| 4,070,444 | 1/1978 | Ingle | 423/341 |
| 4,138,509 | 2/1979 | Ingle et al. | 423/341 |
| 4,230,773 | 10/1980 | Bakos | 427/226 |

FOREIGN PATENT DOCUMENTS

| | | | |
|---|---|---|---|
| 1161868 | 7/1958 | Fed. Rep. of Germany | 423/341 |
| 702349 | 1/1954 | United Kingdom | 423/341 |

OTHER PUBLICATIONS

Grant, J. *Hackh's Chemical Dictionary*, 3rd ed., Philadelphia, Blakiston, 1950, pp. 529+771.

*Primary Examiner*—Michael R. Lusignan
*Assistant Examiner*—Janyce A. Bell
*Attorney, Agent, or Firm*—Robert L. McKellar

[57] ABSTRACT

What is disclosed is a method of forming silicon from the degradation of polychlorosilanes, a method of coating a substrate with said silicon and a product of said coating method. The method of forming silicon consists essentially of pyrolyzing said polychlorosilanes in an inert atmosphere or in a vacuum at a temperature of 500° C. to 1450° C.

7 Claims, No Drawings

PREPARATION OF SILICON METAL THROUGH POLYMER DEGRADATION

BACKGROUND OF THE INVENTION

Polychlorosilanes are well known in the art and were first prepared over one hundred years ago. The methods of preparation are varied as are the types of polychlorosilanes that are prepared by such methods. Two major types of polychlorosilanes exist for our interest herein, the first is the homologous series $Si_nCl_{2n+2}$ which can be compared superficially to the carbon series $C_nH_{2n+2}$. The second type is the silicon subchlorides wherein the chlorine to silicon ratio is below that of the homologous series i.e. $(SiCl_2)_n$ or $(SiCl_{1.5})_n$.

In the first type, almost all of the published literature deals with polychlorosilanes wherein n has a value of 6 or less. For example, Troost and Hautefeville, Ann. Chim. Phys. (5) 7 459(1871) describe the reaction of silicon metal with silicontetrachloride at or above 1000° C. to prepare $Si_2Cl_6$. Friedel, Compt. rend.; 73 1001 (1871) reported that chlorine or mercuric chloride and hexaiododisilane produced $Si_2Cl_6$. Several other researchers also found routes to $Si_2Cl_6$ that were based on chlorosilanes viz. J. B. Quig, J. H. Wilkinson; JACS 48 902-6 (1926); J. Nichl; German Patent 1142848 (1963) E. ENK, Besson and Fournier; Compt. rend. 152 603 (1911).

The subchlorides, $(SiCl_{1.5})_x$ have also been reported on by Besson and Fournier and others. In general, however, little is known of the structures of these subchlorides because characterization has routinely involved a simple Cl/Si ratio.

In all of the prior work, however, no mention has been made of utilizing these polychlorosilanes to obtain silicon metal through pyrolysis.

THE INVENTION

The invention described herein is therefore new and novel and involves the pyrolysis of polychlorosilanes to obtain amorphous and/or crystalline silicon.

It should be noted at the outset that the polychlorosilane precursors of this invention contain no organic substituents on silicon atoms. The valences on the silicon atoms are filled either with another silicon atom or a chlorine atom. The polychlorosilanes of this invention have molecular weights greater than 269 which is the molecular weight of $Si_2Cl_6$.

The polychlorosilane precursors of this invention can be prepared by a number of different methods as long as the final precursor material, before pyrolysis, has no organic substituents and the molecular weight of the precursor is greater than that of $Si_2Cl_6$.

A preferred method of preparing the precursor polychlorosilanes is to contact $Si_2Cl_6$ in an inert atmosphere with a catalyst selected from the group consisting of ammonium halides, tertiary organic amines, quaternary ammonium halides and phosphonium halides at a temperature of from 120° C. to 250° C. for a time sufficient to form a polychlorosilane having a higher molecular weight than that of $Si_2Cl_6$. Preferably, the molecular weight is not increased to the point where the viscosity of the polychlorosilane makes the polychlorosilane difficult to handle.

The precursor polychlorosilanes can then be stored as long as they are kept free from moisture. Those skilled in the art should be warned that the partial hydrolysis products of $Si_2Cl_6$ will sometimes detonate and therefore, due caution should be exercised while handling either $Si_2Cl_6$ or its reaction products.

The instant invention is then carried out by pyrolyzing the polychlorosilane precursor at a temperature of 500° C. to 1450° C. in an inert atmosphere such as argon or nitrogen or, in a vacuum until silicon is formed.

The invention therefore consists of a method of preparing silicon comprising pyrolyzing a polychlorosilane, having a molecular weight greater than the molecular weight of $Si_2Cl_6$, in an inert atmosphere or in a vacuum, at a temperature of 500° C. to 1450° C.

This invention also deals with an article coated with silicon by a method which consists of (I) coating the article with a polychlorosilane having a molecular weight greater than the molecular weight of $Si_2Cl_6$; (II) heating said article to a temperature of 500° C. to 1450° C. for a time sufficient to form silicon and thereafter (III) cooling the article to room temperature whereby an article coated with silicon is obtained.

This invention further deals with a method of coating a substrate with silicon which method comprises (I) treating a substrate with a polychlorosilane having a molecular weight greater than the molecular weight of $Si_2Cl_6$; (II) heating said substrate to a temperature of 500° C. to 1450° C. for a time sufficient to form silicon on the substrate and thereafter (III) cooling the substrate to room temperature whereby a substrate coated with silicon is obtained.

The silicon obtained by this method is pure silicon owing to the absence of any carbon in the starting silanes.

The physical character of the silicon obtained by this method is dependent on the temperature at which the polychlorosilane is pyrolyzed, the pyrolysis temperatures of about 500° C.–1000° C. result in mostly amorphous silicon with some crystalline silicon. As the temperature is increased, more crystalline silicon is formed and the amount of amorphous silicon decreases. Also, when using lower temperatures during pyrolysis, the grains of crystalline silicon are fine, on the order of 80 Å. An increase in temperature results in coarser grain size until finally, the pyrolysis carried out at 1450° C. results in crystalline silicon having an average grain size of 1000–2000 Å.

A "time sufficient" for purposes of this invention is any amount of pyrolysis time that is required to convert the polychlorosilanes to silicon. Such times are typically from a few minutes to 12 hours depending on the article or substrate and the temperature of pyrolysis. "Essentially free from contaminants" for purposes of this invention means purity sufficient for the polychlorosilane to be used for semiconductor applications and solar cells.

Now, so that those skilled in the art can better understand and appreciate this invention, the following examples are given.

Materials were fired in a series 1000 A water cooled graphite heated model 1000.3060-FP-12 Astro Industries furnace under an argon atmosphere and at heating rates of 300°/hr to 300° C., 200° C./hr to 500° C., 100° C./hr to 700° C., and then 300°/hr to 1000° C. and finally as rapidly as possible to 2000° C. (usually 8 hours more).

EXAMPLE 1

Preparation of a precursor polychlorosilane from Si$_2$Cl$_6$

Tetrabutylphosphonium chloride (0.5 gm) was added to a 50 ml round-bottomed glass flask fitted for distillation. The catalyst was dried under vacuum at 130° C. for 10 minutes. Argon was flooded into the flask and there was added 20 gms of Si$_2$Cl$_6$. Mild heating at 70°–80° C. caused the catalyst to turn brown and rise to the surface of the liquid. The heat was increased to 120°–150° C. and a distillate was collected at about 40° C. distillation head temperature. The distillate was identified as silicon tetrachloride. The reaction mixture was a polychlorosilane which was yellow in color. There was a brown-green colored crust on the surface of the viscous oil. The chlorine content was 21.6 weight percent indicating a polymeric silane.

EXAMPLE 2

Example 1 was repeated using 0.2 gm of tetrabutylphosphonium chloride. The reaction was run at 120° C. for six hours to yield a yellow viscous oil with a brownish-black colored appearance.

EXAMPLE 3

Example 1 was repeated using 0.5 gm of catalyst at a temperature of 250° C. for 2 hours to yield an orange oil. This material was fired at 1200° C. in a graphite crucible under argon for 1 hour and then at 1450° C. in a vacuum for 4 hours. Silicon was formed on the crucible.

EXAMPLE 4

Two polychlorosilanes were prepared essentially according to Example 1 except that one was prepared at 0.5 weight percent catalyst at 250° C. and the other was prepared using 1 weight percent catalyst at 200° C. These polychlorosilane oils were slurried together in dry toluene and the polychlorosilanes were decanted away from the catalyst solids. The toluene was removed under vacuum to give a dry brownish-orange colored residue. A portion (7.8 gms) was placed in a graphite crucible and fired in argon to 1200° C. momentarily and then cooled. A 20% yield of silicon resulted wherein the average grain size was 285 Å. Another sample of the material was then pyrolyzed in a vacuum in a Vycor ® silica glass crucible (Corning Glass Works, Corning, NY, U.S.A.) to 1450° C. momentarily and then cooled which resulted in a crystalline silicon with a trace of beta-SiC. This material had a grain size of 1000–2000 Å.

EXAMPLE 5

A polychlorosilane from Si$_2$Cl$_6$ polymer was prepared using 1% tetrabutylphosphonium chloride catalyst at 200° C. for 2 hours. This material was introduced into pentane and extracted for 2 hours. It was then extracted 24 hours with dry toluene and the solvent removed under vacuum to give a moderately viscous oil. This material was fired under argon at 1000° C. for 1 hour to yield an amorphous silicon. The material is primarily amorphous with indication of some short range order that was estimated at 80 Å.

When this material was pyrolyzed at 1200° C., the average grain size was 375 Å.

This sample was fired at three different temperatures.

| Temp. | Atmosphere | Result |
|---|---|---|
| 750° C. | Argon | amorphous |
| 1000° C. | " | amorphous with short range order of about 80 Å |
| 1200° C. | " | 375 Å grain size |

EXAMPLE 6

Another run was made as in Example 1 except the catalyst was not predried. Si$_2$Cl$_6$ was freshly distilled, and used, to give a dry, free-flowing orange brown polymer. Analysis showed %Si=29.3 and %Cl=37.0 and elemental analysis showed crystalline silicon after the orange brown polymer had been pyrolyzed at 1200° C. for 2 hrs. in helium using a Vycor crucible. The average grain size was 330 Å.

EXAMPLE 7

Example 1 was essentially repeated. The yellow taffy-like resulting polymer having an average formula of (SiCl$_{1.8}$)$_x$n was fired to 1200° C. momentarily in a Vycor crucible to yield silicon metal. The polymer before pyrolysis was analyzed to give %Si=29.6, %Cl=69.5, %C≦0.2 and %H≦0.2.

A thermogravimetric curve of this material showed major weight loss ending at about 500° C. Minor weight loss of about 7–8% occurred between 680° C. and 1000° C.

That which is claimed is:

1. A method of preparing silicon consisting essentially of pyrolyzing a polychlorosilane, having a molecular weight greater than the molecular weight of Si$_2$Cl$_6$, in an inert atmosphere or in a vacuum, at a temperature of 500° C. to 1450° C.

2. A method of preparing silicon as in claim 1 wherein the polychlorosilane is free from residual catalyst and solvents.

3. A method of preparing silicon as in claim 1 wherein the polychlorosilane is essentially free from contaminants.

4. An article coated with silicon which article has been coated by a method consisting essentially of
   (I) coating the article with a polychlorosilane having a molecular weight greater than the molecular weight of Si$_2$Cl$_6$;
   (II) heating said article to a temperature of 500° C. to 1450° C. for a time sufficient to form silicon and thereafter
   (III) cooling the article to room temperature whereby an article coated with silicon is obtained.

5. An article as in claim 4 which is a solar cell.

6. An article as in claim 4 wherein the article is coated with the polychlorosilane in a solvent before heating.

7. A method of coating a substrate with silicon which consisting essentially of
   (I) treating a substrate with a polychlorosilane having a molecular weight greater than the molecular weight of Si$_2$Cl$_6$;
   (II) heating said substrate to a temperature of 500° C. to 1450° C. for a time sufficient to form silicon on the substrate and thereafter
   (III) cooling the substrate to room temperature whereby a substrate coated with silicon is obtained.

* * * * *